US010033694B2

(12) United States Patent
Wang et al.

(10) Patent No.: US 10,033,694 B2
(45) Date of Patent: Jul. 24, 2018

(54) METHOD AND DEVICE FOR RECOGNIZING AN IP ADDRESS OF A SPECIFIED CATEGORY, A DEFENSE METHOD AND SYSTEM

(71) Applicant: BEIJING QIHOO TECHNOLOGY COMPANY LIMITED, Beijing (CN)

(72) Inventors: Yanhui Wang, Beijing (CN); Sumei Wang, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 127 days.

(21) Appl. No.: 15/033,202

(22) PCT Filed: Aug. 18, 2014

(86) PCT No.: PCT/CN2014/084642
§ 371 (c)(1),
(2) Date: Apr. 29, 2016

(87) PCT Pub. No.: WO2015/062345
PCT Pub. Date: May 7, 2015

(65) Prior Publication Data
US 2016/0269361 A1 Sep. 15, 2016

(30) Foreign Application Priority Data
Nov. 1, 2013 (CN) .......................... 2013 1 0535856

(51) Int. Cl.
H04L 29/06 (2006.01)
H04L 29/08 (2006.01)

(52) U.S. Cl.
CPC ...... *H04L 63/0236* (2013.01); *H04L 63/0263* (2013.01); *H04L 63/1425* (2013.01); *H04L 67/22* (2013.01)

(58) Field of Classification Search
CPC ............. H04L 63/0236; H04L 63/0263; H04L 63/1425; H04L 67/22
See application file for complete search history.

(56) References Cited

U.S. PATENT DOCUMENTS

2012/0102169 A1* 4/2012 Yu .......................... H04L 67/18
709/223

FOREIGN PATENT DOCUMENTS

CN 101355504 A 1/2009
CN 101753639 A 6/2010
(Continued)

OTHER PUBLICATIONS

International Search Report of the International Searching Authority for Application No. PCT/CN2014/084642, dated Nov. 28, 2014.

*Primary Examiner* — Brandon Hoffman
*Assistant Examiner* — Thong Truong
(74) *Attorney, Agent, or Firm* — Alston & Bird LLP

(57) ABSTRACT

The invention discloses a method and device for recognizing an IP address of a specified category, a defense method and system, wherein the method for recognizing an IP address of a specified category comprises the following steps: collecting behavior record data of several IP addresses (S101); extracting preprocessing data from the collected behavior record data, the extracted preprocessing data comprising at least address information of an IP address and time information of a behavior (S102); analyzing the extracted preprocessing data to obtain behavior-time distribution data of a user using the IP address (S103); and recognizing an IP address of a specified category at least according to the behavior-time distribution data of a user using the IP address (S104). By employing the invention, an IP address of a certain category can be located more accurately locate and the accuracy for recognizing an IP address is improved.

7 Claims, 3 Drawing Sheets

(56) References Cited

FOREIGN PATENT DOCUMENTS

| | | |
|---|---|---|
| CN | 101945400 A | 1/2011 |
| CN | 102611714 A | 7/2012 |
| CN | 103937951 A | 2/2013 |
| CN | 103269326 A | 8/2013 |
| CN | 103475748 A | 12/2013 |
| CN | 103699546 A | 4/2014 |
| CN | 103812961 A | 5/2014 |
| WO | WO 2013/039789 A1 | 3/2013 |

* cited by examiner

METHOD AND DEVICE FOR RECOGNIZING AN IP ADDRESS OF A SPECIFIED CATEGORY, A DEFENSE METHOD AND SYSTEM

FIELD OF THE INVENTION

The invention relates to the field of internet technologies, and in particular, to a method and device for recognizing an IP address of a specified category, and a method and system for improving security defense of a user terminal.

BACKGROUND OF THE INVENTION

The use of computers has been widely popularized in various fields, and both company users and individual users increasingly rely on the use of computers. For each user group that uses computers, in order to more accurately provide better services to a user group of a specified category, it is necessary to accurately judge whether a user IP address (Internet Protocol Address) is an IP address of the specified category. Nowadays, a major way of solving this problem is as follows.

Whether a user IP is an IP address of a specified category is recognized according to the user terminal number corresponding to the user IP. For example, to recognize whether a certain user IP is a company IP address, a threshold of 5 can be set, and if the user terminal number corresponding to the user IP is greater than 5, it is considered as a company IP. This way of directly recognizing whether an IP is a company IP merely according to the user terminal number corresponding to the single IP is very inaccurate, because for some proxy IPs, the user terminal number corresponding to each single IP exceeds tens of thousands or even hundreds of thousands, furthermore, for some residential areas, there may be only one outlet IP, but its corresponding user terminal number is very large. These IPs are not company IP addresses. Therefore, the method of merely using the user terminal number corresponding to a single IP to judge whether the user IP is a company IP address is very inaccurate.

Therefore, a technical problem that urgently needs to be solved by those skilled in the art lies in how to quickly, accurately and effectively judge whether a user IP is an IP address of a certain category.

SUMMARY OF THE INVENTION

In view of the above problems, the invention is proposed to provide a method and device for recognizing an IP address of a specified category and a method and system for improving security defense of a user terminal, which can overcome the above problem or at least partly solve the above problem.

According to an aspect of the invention, there is provided a method for recognizing an IP address of a specified category comprising:

collecting behavior record data of several IP addresses;

extracting preprocessing data from the collected behavior record data, the extracted preprocessing data comprising at least address information of an IP address and time information of a behavior;

processing and analyzing the extracted preprocessing data to obtain behavior-time distribution data of a user using the IP address; and recognizing an IP address of a specified category at least according to the behavior-time distribution data of a user using the IP address.

According to another aspect of the invention, there is provided a device for recognizing an IP address of a specified category comprising:

a data collection unit configured to collect behavior record data of several IP addresses;

a data extraction unit configured to extract preprocessing data from the collected behavior record data, the extracted preprocessing data comprising at least address information of an IP address and time information of a behavior;

a data processing unit configured to process and analyze the extracted preprocessing data to obtain behavior-time distribution data of a user using the IP address; and an address recognition unit configured to recognize an IP address of a specified category at least according to the behavior-time distribution data of a user using the IP address.

According to yet another aspect of the invention, there is provided a method for improving security defense of a user terminal comprising: recognizing an IP address of a specified category in advance by the method for recognizing an IP address of a specified category;

monitoring information security condition and IP address of each terminal; and improving security defense level or performing special security defense processing when a malicious program is found in a corresponding user terminal pertaining to the IP address of the specified category.

According to still another aspect of the invention, there is provided a system for improving security defense of a user terminal comprising the device for recognizing an IP address of a specified category, and the system further comprises:

a monitoring unit configured to monitor information security condition and IP address of each user terminal; and a security defense unit configured to improve security defense level or perform special security defense processing when the monitoring unit finds a malicious program in a user terminal corresponding to an IP address of the specified category recognized by the recognition device.

According to the method and device for recognizing an IP address of a specified category provided by the invention, first, the behavior-time distribution data of a user using the user IP address is obtained by collecting, analyzing and processing behavior record data of a user IP, and finally, an IP address of a specified category is recognized according to the obtained behavior-time distribution data of the user IP address. The invention utilizes the time distribution data of a user IP address to recognize whether the user IP is an IP address of a specified category, and thereby does not need to purely rely on the number of user terminals corresponding to a single IP to recognize the category of the IP address, which can more accurately locate an IP address of a certain category, and improve the accuracy of recognition of an IP address.

Furthermore, the invention further provides a method and system for improving security defense of a user terminal, which first recognizes an IP address of a specified category by the method and system for recognizing an IP address of a specified category provided by the invention. Since in a practical application, more attention is paid to the security condition of a user group of IP addresses of a certain category, at this point, the security information condition of each user terminal and the IP address of the user terminal can be monitored. When a malicious program is found in a user terminal of the recognized IP address which belongs to the specified category, since the malicious program will pose a threat to the security of the user terminal, it is necessary to improve the security defense level of this user terminal or perform special security defense processing, to improve the security defense capability of the user terminal, thereby achieving that the security defense capability of terminals of a user group of a certain category is improved in a targeted manner.

The above description is merely an overview of the technical solutions of the invention. In the following particular embodiments of the invention will be illustrated in order that the technical means of the invention can be more clearly understood and thus may be embodied according to the content of the specification, and that the foregoing and other objects, features and advantages of the invention can be more apparent.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

Figure 1:
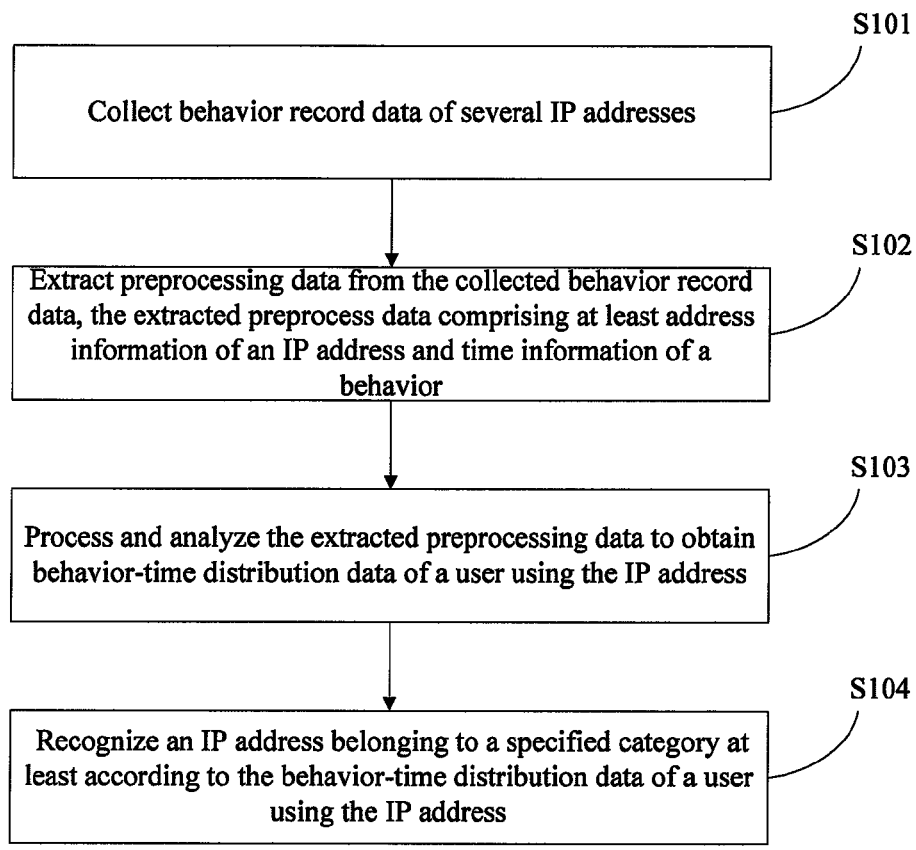
FIG. 1 shows a flow chart of a method for recognizing an IP address of a specified category according to an embodiment of the invention.

In the following exemplary embodiments of the disclosure will be described in more detail with reference to the accompanying drawings. While the exemplary embodiments of the disclosure are shown in the drawings, it will be appreciated that the disclosure may be implemented in various forms and should not be limited by the embodiments set forth herein. Rather, these embodiments are provided in order for one to be able to more thoroughly understand the disclosure and in order to be able to fully convey the scope of the disclosure to those skilled in the art.

With reference to FIG. 1, FIG. 1 shows a flow chart of a method for recognizing an IP address of a specified category according to an embodiment of the invention. In the following, the method provided by the invention will be described according to FIG. 1. A method for recognizing an IP address of a specified category provided by the invention comprises the following steps.

At S101, collect behavior record data of several IP addresses.

In particular, the data needs to be collected is primarily obtained by a behavior log recording the use of a user IP. In general, the behavior log of a user mainly comprises a history record of the use by the user, which primarily comprises a search history, a click history, a purchase history and a data browsing history, etc. In an embodiment of the invention, primarily, the data is obtained by recording behavior logs of a user IP using four products of security software, a security software main interface, anti-virus software, and a browser. In this embodiment, the reason why the four products are employed is that the four products substantially cover all users, their coverage is very large, and the data obtained by the behavior logs of a user IP using the four products is also comparatively comprehensive. Of course, the behavior record data of an IP address can also be obtained by other approaches, for example, the behavior record of starting a computer by a terminal corresponding to the user IP, and the behavior record of using a music player or video player, etc., these all can be taken as data sources.

At S102, extract preprocessing data from the collected behavior record data, the extracted preprocessing data comprising at least address information of an IP address and time information of a behavior.

In a complete information system, the log system is a very important functional constituent part. It can record all behaviors produced by a system, and express them according to a certain specification. In an embodiment of the invention, the behavior log data produced by a user IP using security software, opening a security software main interface, anti-virus software, and a browser is primarily chosen as an analysis object. When data extraction is performed on a behavior log of a user IP, primarily, the address information of the user IP using the above mentioned four products and the time information of producing a behavior, namely, the time when the user IP uses which product, are extracted. In addition, product application identifications of the four products used by the user IP can further be extracted, that is, which product the user IP uses. The application identification can be the name of an application, or can be the address where the application is located, or even the above mentioned several products can be first numbered, and which product it is can be recognized according to the number corresponding to the product. Of course, the product application identifications of the four products used by the user IP can also not be extracted. Since the object of the invention is mainly to recognize whether a user IP is an IP address of a specified category according to the behavior-time distribution data of the user IP, what is most important is to extract the address information of the user IP and the time information of this IP address producing a behavior, and as for the application identification of a product, it is optional. However, in an embodiment of the invention, it is desired to probe into the effect of a user IP using a different product on the final result of recognizing an IP address, and therefore a product application identification of which product the user IP uses is also extracted.

In a practical application, the extracted preprocessing data further comprises the number of user terminals and user terminal identifications corresponding to each IP address. A user terminal identification is information for uniquely identifying a user terminal, and it has many specific implementation forms. For example, a user terminal identification can be obtained according to the network card Mac address of a user terminal and the software serial number of a certain piece of software installed on this user terminal, and the software serial number on the user terminal can be allocated using a specific algorithm to uniquely identify the user terminal. Particularly, how to allocate a software serial number using a algorithm is implemented by the prior art, which will not be described here repetitively. To simplify the following description, the above user terminal identification is customized to be a mid for the time being. To extract the number of user terminals and user terminal identifications mids corresponding to each IP address is mainly for the purpose of preparation for later normalization processing of data, and the normalization processing of data is mainly to divide the total number of mids of user terminals by which users use an IP address by the total number of mids of user terminals corresponding to this IP address. Therein, the number of user terminals corresponding to each IP address and the total number of mids of user terminals by which the user IP has produced a behavior can be counted by the user terminal identification mid, that is, for each user IP, how many terminals are used. Also, the total number of mids of product the user IP uses can also be counted according to the recorded product application identifications. Of course, it has already been stated in the above that the product application identification is optional, and then here counting the total number of mids of which product the user IP uses is also optional.

At S103, process and analyze the extracted preprocessing data to obtain behavior-time distribution data of a user using the IP address.

In a specific implementation procedure, the main object of this step is to obtain behavior-time distribution data of a user using the IP address by perform certain processing and analysis on the preprocessing data extracted by the step S102, and then recognize whether the IP is an IP address of a specified category employing a suitable method. Here, the specified category can be a company, an internet bar, a school or other public place, etc. In an embodiment provided by the invention, the specified category refers to the company, that is, the company is taken as an example to describe the method employed by the invention.

First, the preprocessing data extracted at the step S102 is further processed: according to the user terminal identifications mids, the number of user terminals corresponding to each IP address is counted, namely, the number of mids corresponding to each IP address, and then according to the counted number of user terminals corresponding to each IP address, determine a personal home computer by means of the number of user terminals corresponding to a single IP. In general, for company computers or computers in a public place (e.g., an internet bar), one IP will correspond to multiple mids. In a specific implementation procedure, a threshold can be set according to practical empirical data, e.g. 4, and if the number of mids corresponding to one IP is greater than 4, it may be considered as a company computer or a computer in a public place; and if the number of mids corresponding to one IP is less than or equal to 4, it can be considered as a personal home computer. In the procedure of processing and analyzing the extracted preprocessing data, by means of such a method, home computer IPs in the data are found out, such data is removed, and only the data that the number of mids corresponding to one IP is greater than 4 is kept, which reduces the amount of data that needs to be processed subsequently.

Of course, the processing of this step can also not be performed, directly divide the extracted preprocessing data into multiple dimensions according to the difference in behavior time, and count the number of terminals by which the user uses each IP address in a different period of time.

Since the recognition of an IP address is subsequently performed to recognize which category the IP address belongs to, IP addresses that the number of user terminals is less than a preset threshold can be recognized in a subsequent recognition procedure. The processing of this step is first performed here is mainly because the amount of the extracted preprocessing data is relatively large, and the recognition of IP addresses that the number of user terminals is less than the threshold decreases the amount of data that needs to be processed later, and reduces the burden of subsequent data processing.

Since generally a company computer is comparatively used more in working hours (08:00-19:00 everyday from Monday to Friday) and comparatively used less in non-working hours from Monday to Friday and at weekends, whereas a computer in an internet bar or a computer in a public place is comparatively used less in working hours and comparatively used more in non-working hours and at weekends, for data of each IP address that the number of user terminals is greater than the preset threshold, the data is divided into multiple dimensions, here multiple periods of time, according to the time of the user IP producing a behavior, and the number of terminals by which the user uses the IP address in the different periods of time is counted. In an embodiment of the invention, the time of a user IP producing a behavior is mainly divided into working periods of time from Monday to Friday, i.e., 08:00-19:00 everyday from Monday to Friday; 08:00-19:00 everyday from Saturday to Sunday; non-working periods of time from Monday to Friday, i.e., not 08:00-19:00 everyday from Monday to Friday; not 08:00-19:00 everyday from Saturday to Sunday; 20:00-22:00 everyday from Monday to Sunday. In an embodiment of the invention, the time of a user IP producing a behavior is divided into periods of time of not 08:00-19:00 from Monday to Sunday and periods of time of 20:00-22:00 from Monday to Sunday at the same time, which mainly takes into account a period of time of a wide range (not 08:00-19:00) and a comparatively less period of time (20:00-22:00) at the same time, and improves the accuracy of the result of recognizing whether the user IP is a company IP address. Finally, the total numbers of mids by which each user IP uses the above mentioned several products in these periods of time is recorded.

In addition, in general, the probability that the security software main interface is opened by a company computer and a home computer is relatively large, whereas the probability that the security software main interface is opened by a computer in an internet bar or a computer in a public place is relatively little. Therefore, according to the product application identification of a product used by a user IP, products used by user IPs are also divided. Since in embodiments of the invention, the chosen products are the security software, the security software main interface, the anti-virus software and the browser, the divided several dimensions are respectively the number of mids by which each user IP uses the security software, the number of mids by which the security software main interface is opened, the number of mids by which the anti-virus software is used, and the number of mids by which the browser is used.

The procedure of the step S103 is completed by a computer. Since the data that needs to be processed is relatively large, it is necessary to select an operating environment which can perform rapid and accurate processing on large data. For example, a hadoop system can perform distributed processing on a large amount of data, and can operate rapidly and well for large data. Therefore, in an embodiment of the invention, the processing of data is performed in the hadoop operating environment. By the above described processing procedure, the data is processed into a format as in the following table 1.

TABLE 1

IP address
Number of mids
Number of mids in the period of time of 08:00-19:00 on Monday
Number of mids in the period of time of 08:00-19:00 on Tuesday
Number of mids in the period of time of 08:00-19:00 on Wednesday
Number of mids in the period of time of 08:00-19:00 on Thursday
Number of mids in the period of time of 08:00-19:00 on Friday
Number of mids in the period of time of 08:00-19:00 on Saturday
Number of mids in the period of time of 08:00-19:00 on Sunday
Number of mids not in the period of time of 08:00-19:00 on Monday
Number of mids not in the period of time of 08:00-19:00 on Tuesday
Number of mids not in the period of time of 08:00-19:00 on Wednesday
Number of mids not in the period of time of 08:00-19:00 on Thursday
Number of mids not in the period of time of 08:00-19:00 on Friday
Number of mids not in the period of time of 08:00-19:00 on Saturday
Number of mids not in the period of time of 08:00-19:00 on Sunday
Number of mids in the period of time of 20:00-22:00 on Monday
Number of mids in the period of time of 20:00-22:00 on Tuesday
Number of mids in the period of time of 20:00-22:00 on Wednesday
Number of mids in the period of time of 20:00-22:00 on Thursday
Number of mids in the period of time of 20:00-22:00 on Friday
Number of mids in the period of time of 20:00-22:00 on Saturday
Number of mids in the period of time of 20:00-22:00 on Sunday
Number of mids by which the safety guard is used
Number of mids by which the safety guard main interface is opened
Number of mids by which the anti-virus software is used
Number of mids by which the 360 browser is used After preliminary counting of the preprocessing data extracted at the step S102, normalization processing is performed on the number of user terminals using each IP address in the different periods of time, to obtain behavior-time distribution data of a user using the IP address. In an embodiment provided by the invention, it is to perform normalization processing on the data counted in the table 1. Since in the procedure of preliminarily processing the data at the step S103, IPs that the number of mids corresponding to one user IP is less than 4 are judged to be home computers, in this part, the normalization processing is performed only with respect to the data that the number of mids corresponding to one user IP is greater than 4. In this embodiment, 3 specific implementation schemes are provided respectively.

The first scheme employs 26 dimensions and performs normalization processing on the 26 dimensions. In such a scheme, the data after preprocessing is normalized to decimals between 0 and 1, to facilitate a later analysis of the clustering algorithm. Since termination of the clustering is that a criterion function converges, and if the normalization processing is not performed, then the criterion function can not converge, therefore, the data needs to be normalized to digits between 0 and 1, a specific procedure will be described in detail in the following part of cluster analysis. The normalization processing is to divide the numbers of mids by which a user IP uses the four products in each periods of time from Monday to Sunday by the total number of mids of the user IP, and divide the numbers of mids by which a user IP uses the four products by the total number of mids of the user IP, and in addition, add another dimension, namely, the total number of mids corresponding to each user IP/the maximum value of each total numbers of mids corresponding to all user IPs. Thus, 26 dimensions are obtained, and the data of the 26 dimensions is digits between 0 and 1. After preform the normalization processing on the data of the 26 dimensions, the obtained data result is as shown in the following table 2.

TABLE 2 work_sun = number of mids in the period of time of 08:00-19:00 on Sunday/total number of mids
work_Mon = number of mids in the period of time of 08:00-19:00 on Monday/total number of mids
work_Tue = number of mids in the period of time of 08:00-19:00 on Tuesday/total number of mids
work_Wed = number of mids in the period of time of 08:00-19:00 on Wednesday/total number of mids
work_Thu = number of mids in the period of time of 08:00-19:00 on Thursday/total number of mids
work_Fri = number of mids in the period of time of 08:00-19:00 on Friday/total number of mids
work_Sat = number of mids in the period of time of 08:00-19:00 on Saturday/total number of mids
notwork_sun = number of mids not in the period of time of 08:00-19:00 on Sunday/total number of mids
notwork_Mon = number of mids not in the period of time of 08:00-19:00 on Monday/total number of mids
notwork_Tue = number of mids not in the period of time of 08:00-19:00 on Tuesday/total number of mids
notwork_Wed = number of mids not in the period of time of 08:00-19:00 on Wednesday/total number of mids
notwork_Thu = number of mids not in the period of time of 08:00-19:00 on Thursday/total number of mids
notwork_Fri = number of mids not in the period of time of 08:00-19:00 on Friday/total number of mids
notwork_Sat = number of mids not in the period of time of 08:00-19:00 on Saturday/total number of mids
home_sun = number of mids in the period of time of 20:00-22:00 on Sunday/total number of mids
home_Mon = number of mids in the period of time of 20:00-22:00 on Monday/total number of mids
home_Tue = number of mids in the period of time of 20:00-22:00 on Tuesday/total number of mids
home_Wed = number of mids in the period of time of 20:00-22:00 on Wednesday/total number of mids
home_Thu = number of mids in the period of time of 20:00-22:00 on Thursday/total number of mid
home_Fri = number of mids in the period of time of 20:00-22:00 on Friday/total number of mids
home_Sat = number of mids in the period of time of 20:00-22:00 on Saturday/total number of mids
safe = number of mids by which the safety guard is used/total number of mids
safe_main = number of mids by which the safety guard main interface is opened/total number of mids
sd = number of mids by which the anti-virus software is used/total number of mids
se = number of mids by which the360 browser is used/total number of mids
mids = total number of mids/max(total numbers of mids corresponding to all ips)

The second scheme further merges the 26 dimensions of the first scheme. It merges the numbers of mids by which a user IP uses the four products in the period of time of 08:00-19:00 from Monday to Friday, merges the numbers of mids by which a user IP uses the four products in the period of time of 08:00-19:00 on Saturday and Sunday, merges the numbers of mids by which a user IP uses the four products not in the period of time of 08:00-19:00 from Monday to Friday, merges the numbers of mids by which a user IP uses the four products not in the period of time of 08:00-19:00 on Saturday and Sunday, merges the numbers of mids by which a user IP uses the four products in the period of time of 20:00-22:00 from Monday to Friday, merges the numbers of mids by which a user IP uses the four products in the period of time of 20:00-22:00 on Saturday and Sunday, and performs normalization processing on the merged data, that is, divides the several merged numbers of mids by a product of the total number of mids of each user IP and the number of days. Data obtained after the normalization processing in each dimension is digits between 0 and 1. The data in 11 dimensions after the normalization processing is as follows.

The number of mids in the period of time of 08:00-19:00 on Monday the number of mids in the period of time of 08:00-19:00 on Tuesday the number of mids in the period of time of 08:00-19:00 on Wednesday the number of mids in the period of time of 08:00-19:00 on Thursday the number of mids in the period of time of 08:00-19:00 on Friday the data in the 5 dimensions is merged to obtain work8_19=the number of mids in the period of time of 08:00-19:00 on workdays/the total number of mids (the total number of mids of each IP on the five days).

The number of mids in the period of time of 08:00-19:00 on Saturday the number of mids in the period of time of 08:00-19:00 on Sunday the data in the 2 dimensions is merged to obtain weekend8_19=the number of mids in the period of time of 08:00-19:00 on non-workdays/the total number of mids (the total number of mids of each IP on the two days).

The number of mids not in the period of time of 08:00-19:00 on Monday the number of mids not in the period of time of 08:00-19:00 on Tuesday the number of mids not in the period of time of 08:00-19:00 on Wednesday the number of mids not in the period of time of 08:00-19:00 on Thursday the number of mids not in the period of time of 08:00-19:00 on Friday the data in the 5 dimensions is merged to obtain notwork8_19=the number of mids not in the period of time of 08:00-19:00 on workdays/the total number of mids (the total number of mids of each IP on the five days).

The number of mids not in the period of time of 08:00-19:00 on Saturday the number of mids not in the period of time of 08:00-19:00 on Sunday the data in the 2 dimensions is merged to obtain weekend8_19=the number of mids not in the period of time of 08:00-19:00 on non-workdays/the total number of mids (the total number of mids of each IP on the two days).

The number of mids in the period of time of 20:00-22:00 on Monday the number of mids in the period of time of 20:00-22:00 on Tuesday the number of mids in the period of time of 20:00-22:00 on Wednesday the number of mids in the period of time of 20:00-22:00 on Thursday the number of mids in the period of time of 20:00-22:00 on Friday the data in the 5 dimensions is merged to obtain work20_22=the number of mids in the period of time of 20:00-22:00 on workdays/the total number of mids (the total number of mids of each IP on the five days).

The number of mids in the period of time of 20:00-22:00 on Saturday the number of mids in the period of time of 20:00-22:00 on Sunday the data in the 2 dimensions is merged to obtain weekend20_22=the number of mids in the period of time of 20:00-22:00 on non-workdays/the total number of mids (the total number of mids of each IP on the two days).

Safe=the number of mids by which the safety guard is used/the total number of mids Safe_main=the number of mids by which the safety guard main interface is opened/the total number of mids Sd=the number of mids by which the anti-virus software is used/the total number of mids Se=the number of mids by which the 360 browser is used/the total number of mids Mids=the total number of mids/max (the total numbers of mids corresponding to all ips).

Since the above two schemes are both affected by the total number of mids corresponding to each user IP, the third scheme is adopted, which selects the maximum of the total numbers of mids corresponding to each user IP as a reference point to observe the characteristics of the data, that is, divides the numbers of mids by which a user IP uses the four products in each period of time everyday by the maximum number of mids among the total numbers of mids corresponding to each user IP. In addition, removal of the last five dimensions in the first scheme and the second scheme is for probing into the effect of the four products on the clustering result. Thus, the third scheme selects 21 dimensions, and the result obtained by performing the normalization processing on the data in the 21 dimensions is as shown in the following table 3.

TABLE 3 work_sun = number of mids in the period of time of 08:00-19:00 on Sunday/maximum number of mids among all properties
work_Mon = number of mids in the period of time of 08:00-19:00 on Monday/maximum number of mids among all properties
work_Tue = number of mids in the period of time of 08:00-19:00 on Tuesday/maximum number of mids among all properties
work_Wed = number of mids in the period of time of 08:00-19:00 on Wednesday/maximum number of mids among all properties
work_Thu = number of mids in the period of time of 08:00-19:00 on Thursday/maximum number of mids among all properties
work_Fri = number of mids in the period of time of 08:00-19:00 on Friday/maximum number of mids among all properties
work_Sat = number of mids in the period of time of 08:00-19:00 on Saturday/maximum number of mids among all properties
notwork_sun = number of mids not in the period of time of 08:00-19:00 on Sunday/maximum number of mids among all properties
notwork_Mon = number of mids not in the period of time of 08:00-19:00 on Monday/maximum number of mids among all properties
notwork_Tue = number of mids not in the period of time of 08:00-19:00 on Tuesday/maximum number of mids among all properties
notwork_Wed = number of mids not in the period of time of 08:00-19:00 on Wednesday/maximum number of mids among all properties
notwork_Thu = number of mids not in the period of time of 08:00-19:00 on Thursday/maximum number of mids among all properties
notwork_Fri = number of mids not in the period of time of 08:00-19:00 on Friday/maximum number of mids among all properties
notwork_Sat = number of mids not in the period of time of 08:00-19:00 on Saturday/maximum number of mids among all properties
home_sun = number of mids in the period of time of 20:00-22:00 on Sunday/maximum number of mids among all properties
home_Mon = number of mids in the period of time of 20:00-22:00 on Monday/maximum number of mids among all properties
home_Tue = number of mids in the period of time of 20:00-22:00 on Tuesday/maximum number of mids among all properties
home_Wed = number of mids in the period of time of 20:00-22:00 on Wednesday/maximum number of mids among all properties
home_Thu = number of mids in the period of time of 20:00-22:00 on Thursday/maximum number of mids among all properties
home_Fri = number of mids in the period of time of 20:00-22:00 on Friday/maximum number of mids among all properties
home_Sat = number of mids in the period of time of 20:00-22:00 on Saturday/maximum number of mids among all properties By the step S103, the normalization processing is performed for the three schemes to obtain the behavior-time distribution data of a user IP for the subsequent recognition of the user IP. Furthermore, in a practical application, generally, the data after the normalization processing will be stored in a set storage area for invocation when the data needs to be used. Since the amount of data is relatively large, the preset storage area can be set in a local disk of a server, and the data can be stored in the storage area in the form of a table or database. The storage in the storage area records the behavior-time distribution data of a user IP of the above three schemes.

At S104, recognize an IP address of a specified category at least according to the behavior-time distribution data of a user using the IP address.

By processing and analyzing the data at the step S103, the behavior-time distribution data of a user IP is obtained, and an IP address of a specified category is recognized by the step S104 according to the behavior-time distribution data of the user IP. As described above, in an embodiment of the invention, the specified category refers to the company, that is, it is recognized whether a user IP belongs to a company IP address by the step S104. In a specific implementation, multiple ways may be adopted for implementation. One method is to perform cluster analysis on multiple IP addresses by combining one or more kinds of clustering mode, to recognize an IP address of a specified category. Therein, one or more of multiple clustering approaches of the Kmeans algorithm, the DBscan algorithm, the KMedoids algorithm, etc. can be employed to recognize an IP address of a specified category. In this embodiment, employing a way of combining multiple clustering algorithms is taken as an example to illustrate the method for recognizing an IP address of a specified category provided by the invention. In particular, in the multiple clustering algorithms provided by the invention, the inventors have found that employing one clustering algorithm, the accuracy of recognition of a user IP is generally not high. Take a company IP address in an embodiment of the invention as an example. When merely one clustering algorithm is used, for example, the Kmeans clustering algorithm is used, since behavior-time distributions of many non-company IP addresses are similar to the behavior-time distribution of a company IP address, these non-company IPs will be counted in company IPs. As another example, pure use of the DBScan algorithm can not perform rapid cluster analysis on large data. To this end, in the embodiment of the invention, an IP address is recognized employing a way of combining multiple clustering algorithms. In the following, a detailed description will be conducted taking as an example that multiple clustering algorithms are used in combination to improve the accuracy of recognizing an IP address.

In the embodiment of the invention, preforming the cluster analysis on multiple IP addresses employing a way of combining multiple cluster modes comprises: at a first step, selecting from the collected several IP addresses at least two IP addresses known to belong to different categories as initial nodes of a first clustering mode, and based on the behavior-time distribution data of each IP address and the behavior-time distribution data of the initial nodes, performing clustering on the collected multiple IP addresses employing the first clustering mode to recognize IP addresses of each category. In particular, since the amount of data is very large and the Kmeans clustering algorithm is suitable for processing large data, the first clustering mode selects to employ the Kmeans algorithm to perform first-time cluster analysis of the kmeans (called Kmeans1) algorithm on the data. At this step, clustering by the Kmeans1 algorithm is performed on the data of the three schemes, so as to compare the effect of which scheme is good. In the result of the last clustering, all user IPs are clustered into two categories as far as possible, namely, company IPs and non-company IPs. The running speed of the cluster analysis is fast, and the accuracy of the result of the clustering is high. Therefore, first, the clustering by the Kmeans1 algorithm is performed for the three schemes, to study which scheme is closest to an ideal state.

The Kmeans clustering algorithm is suitable for processing large data. First, k objects are randomly selected from n data objects to be initial cluster centers. For each of the remaining objects, according to the similarities (distances) between them and these cluster centers, they are respectively allocated to clusters which are the most similar to them; and then the cluster center of each of the obtained new clusters (the mean value of all objects in the cluster) is calculated. This procedure is repeated continuously, until the criterion function converges. The criterion function is as follows:

$$E = \sum_{i=1}^{k} \sum_{x \in C_i} |x - \overline{x_i}|^2$$

In fact, the criterion function is the sum of squared errors of all objects. The finally clustered k clusters have the following features: an cluster itself is compact as far as possible, whereas each cluster is apart from others as far as possible.

In this embodiment, the clustering by the Kmeans1 algorithm is performed for all three schemes. Since each time the Kmeans algorithm is running, k objects are randomly designated as initial cluster centers, the goodness or badness of the clustering effect resulting from the clustering by the Kmeans algorithm has a lot to do with the selection of the initial objects. For lowering the suffered impact, before performing the Kmeans algorithm, data corresponding to two known IP addresses (one is a company IP address, and the other is a non-company IP address) is first selected to be initial objects as initial cluster centers, and the effect of such clustering is better than that resulting from the clustering in which initial objects are randomly selected as initial cluster centers.

The Kmeans1 clustering is performed on the data in the first scheme. First, from the whole data, data corresponding to a company IP and a non-company IP is selected as initial cluster centers. Since data corresponding to each IP has 26 dimensions, first, the 26 dimensions are numbered, for example, the 26 dimensions are successively numbered to be A, B, C, . . . , X, Y, Z. Since the number of user IPs is large, each IP is also numbered, for example, the number of each IP is successively 1, 2, 3, . . . . Suppose it is known that an IP of which the number is 1 is a company IP, and an IP of which the number is 2 is a non-company IP. The data in 26 dimensions corresponding to the two IPs is selected as initial cluster centers, the two clusters are numbered to be 1 and 2, and for an IP of which the number is 3, the similarities between it and the cluster of which the number is 1 and between it and the cluster of which the number is 2 are calculated respectively, that is, the distance between two clusters. In this embodiment, calculation of the distance between two clusters is to calculate the total sum of squared errors of each corresponding dimensions of the two clusters. For example, when calculating the distance between the IP of which the number is 3 and the cluster of which the number is 1, the square of the difference between the A dimension of the IP of which the number is 3 and the A dimension of the cluster of which the number is 1 is calculated and denoted as A2; the square of the difference between the B dimension of the IP of which the number is 3 and the B dimension of the cluster of which the number is 1 is calculated and denoted as B2; . . . ; till the square of the difference between the Z dimension of the IP of which the number is 3 and the Z dimension of the cluster of which the number is 1 is calculated and denoted as Z2. Then, the distance between the IP of which the number is 3 and the cluster of which the number is 1 is S312=A2+B2+ . . . +Z2. When calculating the distance between the IP of which the number is 3 and the cluster of which the number is 2, the specific distance algorithm is consistent with the distance algorithm of calculating the distance between the IP of which the number is 3 and the cluster of which the number is 1, which will not be repeated here, and the distance is denoted as S322. S312 and S322 are compared respectively, to find the smaller value, for example, if it is S312, and then the IP of which the number is 3 and the cluster of which the number is 1 are classified as the same class, that is, the IP of which the number is 3 and a cluster which has the largest similarity to it are classified as the same class, to obtain a new cluster, that is, the objects in the new cluster are the IP of which the number is 1 and the IP of which the number is 3. When classifying an IP of which the number is 4, the cluster center of the new cluster is first calculated, that is, the mean value of all objects in the new cluster is calculated as the new cluster center of this cluster. In this embodiment, the mean value of the IP of which the number is 1 and the IP of which the number is 3 is calculated as the cluster center of the new cluster, and the new cluster is denoted as 13. When clustering the IP of which the number is 4, the distance between the IP of which the number is 4 and the cluster of which the number is 2 is calculated, and the distance between the IP of which the number is 4 and the cluster of which the number is 13 is calculated. The IP of which the number is 4 and the cluster closer to it are classified as the same class, to obtain a new cluster, and then the cluster center of the new cluster is calculated. The remaining IPs continue to be clustered. The above calculation procedure is repeated continuously, till the criterion function converges, that is, the sum of distances between all objects in 2 clusters and the cluster center is less than a certain value. A threshold can be set in advance. When the criterion function is less than the threshold, the repetition of the clustering procedure is finished. Smaller the set threshold is, more accurate the clustering result may be. The threshold can be adjusted in the clustering procedure according to the current condition of the clustering, such that the resulting clustering effect is better.

In the embodiment of the invention, the Kmeans1 clustering is performed for the above described three schemes. It turns out that there is no obvious difference between the clustering effect of the third scheme and that of the second scheme. In addition, the clustering effect of the second scheme is inferior to that of the first scheme. Therefore, in this embodiment, the first scheme is selected as the analysis scheme. A partial result after the clustering is performed for the first scheme using the Kmeans algorithm the first time is as shown in the following table 4.

TABLE 4

Aug. 11, 2011 to Aug. 17, 2011 logs of the safety guard, the safety guard main interface being opened, the anti-virus, and the browser: 68550353 records
Running time: 6.5 hours

| 26 properties | | |
| --- | --- | --- |
| Classifying result | Number of IPs | Percentage |
| Non-company | 67,090,980 | 97.9% |
| Company | 1,459,373 | 2.1% |
| IP | Judgment result of Kmeans | Correct result |
| 61.148.97.86 | Company | Company |
| 219.239.9.5 | Company | Company |
| 203.187.171.67 | Company | Company |
| 27.115.26.170 | Company | Company |

TABLE 4-continued

Aug. 11, 2011 to Aug. 17, 2011 logs of the safety guard, the safety guard main interface being opened, the anti-virus, and the browser: 68550353 records
Running time: 6.5 hours

| | | |
| --- | --- | --- |
| 211.94.36.133 | Company | Company |
| 221.8.96.12 | Company | Company |
| 124.126.245.14 | Company | Company |
| 222.131.232.139 | Non-company | Home |
| 221.218.171.133 | Non-company | Home |
| 122.141.212.24 | Non-company | Home |
| 221.216.54.38 | Non-company | Home |
| 58.18.96.34 | Company | Internet bar |
| 58.42.248.26 | Company | Internet bar |
| 218.75.156.34 | Non-company | Internet bar |
| 58.18.4.36 | Company | Internet bar |
| 221.218.169.4 (Sometimes PC, sometimes internet bar computer) | Non-company | Internet bar |
| 202.118.253.110 | Company | School |
| 220.169.30.220 | Company | School |

It can be seen from table 4 that if the internet bar and the school are counted in the company, the correct rate is 89.89%, otherwise, the correct rate is 72.22%.

So far, for the collected multiple IP addresses, the first clustering mode, i.e., the Kmeans algorithm, is adopted to recognize IP addresses of each category. Since the clustering effect resulting from the clustering by the Kmeans algorithm has a lot to do with the selection of initial cluster centers, if the initial cluster centers are well selected, the resulting clustering effect can also be better, whereas if the initial cluster centers are not well selected, the resulting clustering effect can not be good, the accuracy of the result of the clustering by the Kmeans algorithm is generally not high. What's more, the Kmeans algorithm is not suitable for finding a cluster of a non-convex shape, and is insensitive to noise and isolated points. At this point, it is necessary to perform second-time clustering on IP addresses of specified categories clustered by the Kmeans algorithm, that is, perform cluster analysis on the recognized IP addresses employing a second clustering mode, to obtain the data distribution characteristics of the specified categories. Since the DBSCan algorithm can find a cluster of any shape, and can distinguish noise and isolated points. Therefore, the second clustering mode can employ the DBScan algorithm for clustering, that is, employ the DBScan algorithm to cluster again the data clustered by the Kmeans1 to find noise or isolated points.

Since the accuracy of non-company IPs clustered by the Kmeans1 algorithm is already very high, whereas the accuracy of company IPs clustered by the Kmeans1 is relatively low, it can be seen from table 4 that if the Kmeans algorithm is employed only once for clustering, many non-company IPs will be clustered into company IPs, for example, internet bar IPs and school IPs will generally be counted in company IPs. Therefore, here, the clustering by the DBSCan algorithm is performed only on company IPs clustered by the Kmeans, to analyze the data distribution characteristics of company IPs, and according to the data distribution characteristics, cluster analysis is further performed on the data to improve the accuracy of the clustering. In addition, the last dimension, i.e., the dimension Mids=total number of mids/max, is removed, since this dimension has no effect on the result of the clustering. Since the DBSCan algorithm is not suitable for processing large data, a certain amount of data is extracted from company IPs clustered by the Kmeans1 algorithm for cluster analysis by the DBSCan algorithm. First, an amount of data extraction is determined, wherein the amount of data extraction does not exceed the total amount of data of the company IPs. Then, a random function rand( ) is set, wherein the random function rand( ) will automatically generate a series of random numbers. Since all the user IPs are numbered at the step S105, in this step, the company IPs can be extracted according to the random numbers. If the amount of data extracted once can not reach a predetermined amount of data, the random function rand( ) is utilized again to generate random numbers, data extraction is performed again, and repetitive data extracted each time is deleted, till the extracted amount of data reaches the predetermined amount of data, and all the data is not repetitive. After the data extraction, the DBSCan algorithm is employed to perform cluster analysis on this data.

The DBSCan (Density-Based Spatial Clustering of Applications with Noise) algorithm is a density-based clustering algorithm, which defines a cluster as a largest collection of density-connected points, it can divide an area with a sufficiently high density into clusters, and can find a cluster of any shape in a spatial database with "noise". The DBSCan algorithm first sets a neighborhood radius ε and a minimum number MinPts, extracts a raw point from a database containing n objects, and if the extracted point is a core point, then finds all objects which are density-reachable from the point to form a cluster; and if the extracted point is an edge point (a non-core point), then exits the current loop and looks for a next point. This procedure is repeated, till all the points are processed. Therein, some basic definitions are as follows:

ε-neighborhood of an object: an area within a radius ε of a given object;

a core object: a given object is called a core object, if the number of sample points within the ε-neighborhood of the object is greater than or equal to MinPts;

directly density-reachable: given a collection of objects D, if p is within the ε-neighborhood of q, and q is a core object, the object p is called directly density-reachable starting from the object q;

density-reachable: if an object chain p1, p2, . . . , pn exists, wherein p1=q, and pn=p, for any pi belongs to D, pi+1 is directly density-reachable from pi with respect to ε and MinPts, then the object p is density-reachable from the object q with respect to ε and MinPts;

density-connected: if an object o exists in a objects collection D, that makes objects p and q density-reachable from o with respect to ε and MinPts, then the objects p and q are reachable with respect to ε and MinPts; and noise: a density-based cluster is a largest collection of density-connected objects based on density reachability. An object not comprised in any cluster is considered as "noise".

Since the DBSCan algorithm is very sensitive to a selected parameter, that is, different selection of the amount of data extraction, the radius ε and the minimum number MinPts will cause a great influence on the clustering effect, a slightly different of parameters may cause clustering effects with a large difference, and yet the selection of a parameter has no rule to follow and can only be determined empirically. Therefore, in an embodiment of the invention, several sets of different parameters are set to explore the influence of the selection of a parameter on the clustering effect and the parameter conditions when the clustering effect is relatively ideal. When it comes to specific selection, three sets of different parameters are selected, which respectively are the amount of data extraction=10000, the radius=0.5, MinPts=80; the amount of data extraction=20000, the radius=0.4, MinPts=90; and the amount of data extraction=30000, the radius=0.5, MinPts=60.

In the following, the first set of parameters is taken as an example to illustrate the clustering by the DBSCan algorithm in this embodiment. First, data of 10000 company IPs is extracted from the data of company IPs clustered by the Kmeans1 algorithm, and data of one company IP is selected from the 10000 pieces of data to be an initial node. If this node is a core node, that is, 80 other company IPs are within a range of a radius of 0.5 of the IP, specifically, by calculating the distances between other company IPs and this company IP, if the distances are less than or equal to 0.5, and the number of such company IPs reaches 80, the selected company IP is a core node, then all objects which are density-reachable from the core node are found and form a cluster. If the extracted company IP is an edge node, namely, a non-core node, the current loop is jumped out to look for a next company IP. This procedure is repeated all the time, till all company IPs are processed.

Compared with the Kmeans algorithm, the DBSCan algorithm is does not need to input the number of clusters to be divided, it will automatically divide data into several clusters. When specifically selected parameters are different, the DBSCan algorithm will also divide data into clusters with different numbers. In this embodiment, the first set of parameters is taken as an example, the DBSCan algorithm divides sampled data into three classes, and in addition, there further are isolated points, i.e., points that can not be classified as any of the above three classes, they are called class 1, class 2, class 3 and isolated points, respectively. The result of sampling and cluster analysis of data of company IPs clustered by the Kmeans1 employing the DBSCan algorithm is as shown in the following table 5.

TABLE 5

| | DBScan |
|---|---|
| Data source | 2011-08-11 to 2011-08-17, judged to be data of companies by Kmeans, totally 1,459,373 records |
| Number of properties | 25 (Proportion of the total number of MIDs corresponding to a single IP removed) |
| Amount of randomly extracted data | 10,000 |
| Radius | 0.5 |
| MinPts | 80 |
| Clustering result (3 classes + isolated points): | |

TABLE 5-continued

| | DBScan | | | | | | |
|---|---|---|---|---|---|---|---|
| | sun | Mon | Tue | wed | thu | Fri | sat |
| | 08:00-19:00 | | | | | | |
| Class 1 | 25.2% | 68.2% | 66.9% | 66.2% | 66.6% | 64.8% | 30.4% |
| Class 2 | 15.7% | 69.9% | 67.6% | 66.3% | 66.9% | 66.3% | 20.3% |
| Class 3 | 26.2% | 76.9% | 77.5% | 76.3% | 77.1% | 75.9% | 61.2% |
| Isolated points | 39.0% | 52.3% | 50.5% | 48.4% | 48.1% | 48.8% | 41.5% |
| | Not 08:00-19:00 | | | | | | |
| Class 1 | 15.3% | 21.7% | 22.3% | 22.4% | 22.2% | 21.4% | 16.3% |
| Class 2 | 8.5% | 14.5% | 15.0% | 15.1% | 15.0% | 14.2% | 9.3% |
| Class 3 | 14.6% | 29.7% | 29.5% | 30.7% | 31.5% | 28.0% | 24.5% |
| Isolated points | 29.3% | 32.9% | 31.9% | 30.6% | 30.8% | 30.9% | 30.0% |
| | 20:00-22:00 | | | | | | |
| Class 1 | 11.0% | 13.4% | 13.5% | 13.4% | 13.3% | 12.0% | 11.0% |
| Class 2 | 6.3% | 8.2% | 8.3% | 8.4% | 8.4% | 7.1% | 6.4% |
| Class 3 | 9.6% | 14.7% | 14.9% | 14.9% | 15.6% | 13.1% | 11.0% |
| Isolated points | 21.0% | 22.3% | 21.2% | 19.9% | 20.6% | 20.8% | 20.8% |

| | Others | | | | | |
|---|---|---|---|---|---|---|
| | safe | safe_main | sd | se | Number of IPs | Proportion of the total number |
| Class 1 | 73.5% | 56.7% | 59.4% | 59.6% | 2470 | 21.7% |
| Class 2 | 73.0% | 55.2% | 57.2% | 58.8% | 1668 | 14.6% |
| Class 3 | 73.1% | 60.3% | 57.8% | 61.9% | 96 | 0.8% |
| Isolated points | 68.5% | 54.5% | 58.4% | 58.0% | 7160 | 62.8% |

It can be seen from the data result of table 5 that the behaviors of class 1, class 2 and class 3 are basically similar, which are all that a user IP is used with a relatively high proportion in a working period of time on a workday, and is used with a relatively low proportion at other times, that is, a user IP is used with a relatively high proportion in working hours of 08:00-19:00 from Monday to Friday, and is used with a relatively low proportion at other times from Monday to Friday and at weekends, which is very similar to behavior features of a company user, and can be considered as the behavior of a company user, and then class 1, class 2 and class 3 are company IPs; whereas although the behavior of isolated points is also similar to those of class 1, class 2 and class 3, a user IP is used with a relatively low proportion in each periods of time, which is not very similar to the behavior features of a company user and is more like a behavior in an internet bar or other public place, and then isolated points can be considered as IPs of other public place, e.g., internet bar, school, etc. However, purely from the perspective of a used product, there is no obvious difference in proportions of which product is used for class 1, class 2, class 3 and isolated points, and therefore, the product can be considered to have no obvious influence on the clustering effect.

For data selected by the second set of parameters is, that is, the data that the amount of data extraction is 20000, the radius is 0.4, the minimum number MinPts is 90, the result after the clustering by the DBSCan algorithm refers to the following table 6. Under this selected set of parameters, the DBSCan algorithm clusters the data into one class and isolated points, called class 1 and isolated points. The result of sampling and cluster analysis of data of company IPs clustered by the Kmeans1 employing the DBSCan algorithm is as shown in the following table 6.

TABLE 6

| DBScan | |
|---|---|
| Data source | 2011-08-11 to 2011-08-17, judged to be data of companies by Kmeans, totally 1,459,373 records |
| Number of properties | 25 (Proportion of the total number of MIDs corresponding to a single IP removed) |
| Amount of randomly extracted data | 20,000 |
| Radius | 0.4 |
| MinPts | 90 |
| Clustering result (1 class + isolated points): | |

| | sun | Mon | Tue | wed | thu | fri | sat |
|---|---|---|---|---|---|---|---|
| | 08:00-19:00 | | | | | | |
| Class 1 | 20.2% | 70.3% | 68.3% | 67.7% | 68.0% | 66.6% | 24.8% |
| Isolated points | 37.1% | 53.3% | 51.8% | 50.0% | 49.7% | 49.9% | 40.6% |

TABLE 6-continued

| | DBScan | | | | | | |
|---|---|---|---|---|---|---|---|
| | Not 08:00-19:00 | | | | | | |
| Class 1 | 12.6% | 18.5% | 19.1% | 19.2% | 19.5% | 18.4% | 13.3% |
| Isolated points | 27.6% | 31.5% | 30.9% | 29.6% | 29.9% | 29.8% | 28.5% |
| | 20:00-22:00 | | | | | | |
| Class 1 | 9.3% | 11.4% | 11.7% | 11.7% | 11.7% | 10.3% | 9.4% |
| Isolated points | 19.8% | 21.0% | 20.3% | 18.9% | 19.8% | 19.7% | 19.5% |

| | Others | | | | | |
|---|---|---|---|---|---|---|
| | safe | safe_main | Sd | se | Number of IPs | Proportion of the total number |
| Class 1 | 73.0% | 55.5% | 58.1% | 60.6% | 3267 | 16.3% |
| Isolated points | 69.0% | 54.7% | 58.1% | 58.0% | 16733 | 83.7% |

It can be seen from the data result of table 6 that the behavior of class 1 is more like the behavior of a company user, that is, a user IP is used with a relatively high proportion in a working period of time, and is used with a relatively low proportion in a non-working period of time, and class 1 may be considered as company IPs; the behavior of isolated points is more like the behavior of a public place such as internet bar, etc., there is no obvious difference in proportions of a user IP is used in each period of time, and isolated points can be considered as IPs of an internet bar or other public place. There is no obvious difference in use of a product for class 1 and isolated points, and it can be considered that a product has no influence on the clustering effect.

For data selected by the third set of parameters, that is, the data that the amount of data extraction is 30000, the radius is 0.5, MinPts is 60, the result after the clustering by the DBSCan algorithm refers to the following table 7. Under this set of parameters, the DBSCan algorithm clusters the data into four classes and isolated points, called class 1, class 2, class 3, class 4 and isolated points, respectively. The result of sampling and cluster analysis of data of company IPs clustered by the Kmeans1 employing the DBSCan algorithm is as shown in the following table 7.

TABLE 7

| | DBScan |
|---|---|
| Data source | 2011-08-11 to 2011-08-17, judged to be data of companies by Kmeans, totally 1,459,373 records |
| Number of properties | 25 (Proportion of the total number of MIDs corresponding to a single IP removed) |
| Amount of randomly extracted data | 30,000 |
| Radius | 0.5 |
| MinPts | 60 |
| Clustering result (4 classes + isolated points) | |

| | sun | Mon | Tue | wed | thu | fri | sat |
|---|---|---|---|---|---|---|---|
| | 08:00-19:00 | | | | | | |
| Class 1 | 26.5% | 63.6% | 62.0% | 61.0% | 60.7% | 59.7% | 32.1% |
| Class 2 | 13.5% | 76.8% | 74.2% | 72.3% | 73.4% | 72.2% | 20.9% |
| Class 3 | 39.3% | 77.1% | 75.0% | 78.1% | 74.3% | 74.6% | 63.6% |
| Class 4 | 59.2% | 61.8% | 62.2% | 61.9% | 62.0% | 61.5% | 58.6% |
| Isolated points | 40.0% | 51.3% | 49.5% | 47.4% | 47.7% | 48.6% | 42.6% |
| | Not 08:00-19:00 | | | | | | |
| Class 1 | 16.9% | 22.9% | 23.0% | 22.7% | 22.7% | 22.0% | 18.1% |
| Class 2 | 7.3% | 14.7% | 15.1% | 15.0% | 15.3% | 14.0% | 8.3% |
| Class 3 | 11.1% | 17.6% | 16.3% | 16.3% | 14.2% | 13.9% | 12.7% |
| Class 4 | 49.8% | 51.2% | 51.6% | 51.4% | 51.3% | 51.7% | 50.8% |
| Isolated points | 30.7% | 34.1% | 33.1% | 31.3% | 32.0% | 32.6% | 31.5% |
| | 20:00-22:00 | | | | | | |
| Class 1 | 12.3% | 14.0% | 14.0% | 13.5% | 13.8% | 12.9% | 12.1% |
| Class 2 | 5.5% | 7.9% | 7.9% | 7.9% | 8.0% | 6.5% | 5.5% |
| Class 3 | 7.4% | 9.6% | 10.1% | 9.7% | 8.4% | 8.8% | 7.5% |
| Class 4 | 38.1% | 39.8% | 39.8% | 39.5% | 39.5% | 39.1% | 38.2% |
| Isolated points | 21.8% | 23.0% | 22.1% | 20.3% | 21.4% | 22.0% | 21.5% |

TABLE 7-continued

DBScan

| | Others | | | | |
|---|---|---|---|---|---|
| | safe | safe_main | Sd | se | Number of IPs | Proportion of the total number |
|---|---|---|---|---|---|---|
| Class 1 | 73.3% | 55.5% | 58.9% | 59.0% | 11964 | 35.0% |
| Class 2 | 74.0% | 57.3% | 60.7% | 59.2% | 3885 | 11.4% |
| Class 3 | 72.1% | 58.4% | 69.1% | 60.0% | 68 | 0.2% |
| Class 4 | 75.9% | 64.2% | 63.8% | 61.3% | 531 | 1.6% |
| Isolated points | 67.2% | 54.1% | 57.5% | 58.0% | 17712 | 51.9% |

It can be seen from the data result of table 7 that the behaviors of class 1, class 2, class 3 and class 4 are similar, which are all that a user IP is used with a relatively high proportion in a working period of time, and is used with a relatively low proportion in a non-working period of time, which is very similar to behavior features of a company, and it can be considered that the four classes are company IPs; whereas although the behavior of isolated points is also similar to those of class 1, class 2, class 3 and class 4, a user IP is used with a relatively low proportion in each period of time, which is not very similar to the behavior features of a company and is more like a behavior in an internet bar or other public place, and isolated points can be considered as IPs of an internet bar or other public place. There is no obvious difference in use of a product for class 1, class 2, class 3, class 4 and isolated points, and the product can be considered to have no influence on the clustering effect.

It can be seen from the results after the clustering by the DBSCan algorithm is performed on data elected by the three different sets of parameters that, among the three sets of different parameters, when the second set of parameters is selected, i.e., the amount of data extraction=20000, the radius=0.4, and the minimum number MinPts=90, the whole data is clustered into one class and isolated points; when the first set of parameters is selected, the whole data is clustered into three classes and isolated points; and when the third set of parameters is selected, the whole data is clustered into four classes and isolated points. An object of the invention is to want to distinguish between a company IP and a non-company IP, and therefore, an ideal effect of the clustering is to cluster all user IPs into two classes, i.e., company IPs and non-company IPs. In the situation that the second set of parameters is selected, the extracted data is just clustered into class 1 and isolated points, yet class 1 is company IPs, and the isolated points are non-company IPs. Therefore, when the first set of parameters is selected, the resulting clustering effect is better than those when the second set of parameters is selected and when the third set of parameters is selected, which also exactly illustrates that the DBSCan algorithm is very sensitive to parameters, and different selection of parameters will cause very different clustering effects.

By the DBSCan algorithm, isolated points in company IPs clustered by the Kmeans1 are found out, which can be considered as IPs of an internet bar or other public place, i.e., non-company IPs. Since company IPs clustered by the Kmeans1 are not particularly pure, which is mainly because the clustering by the Kmeans algorithm has a lot to do with the selection of initial nodes of the clustering, according to the data distribution characteristics obtained by the step S104, the initial nodes of the first clustering mode (e.g., Kmeans) are modified, and the modified initial nodes are adopted to perform clustering again on the multiple IP addresses of a specified category recognized previously employing the first clustering mode (i.e., Kmeans), to further purify the IP addresses of the specified category. As reflected in an embodiment of the invention, in particular, according to isolated points clustered by the step S104, the mean value of all objects in the isolated points is taken as an initial cluster center of non-company IPs, i.e., the initial cluster center of non-company IPs selected by the Kmeans1 clustering is modified, and the modified initial cluster center is adopted as the initial cluster center of non-company IPs of Kmeans2. Then, a known company IP is again selected as the initial cluster center of the category of company IPs. This time, also, Kmeans cluster analysis is performed once again only on company IPs clustered by the Kmeans1 clustering. The specific procedure of cluster analysis is similar to that of Kmeans1 clustering, and will not be repeated here. The data result after the second-time clustering by the Kmeans algorithm is as in the following table 8.

TABLE 8

Aug. 11, 2011 to Aug. 17, 2011 company data after the Kmeans clustering of the safety guard, the safety guard main interface being opened, the anti-virus, and the browser: 1459373 records
Running time: 2.5 minutes 25 properties

| Classifying result | Number of IPs | Percentage |
|---|---|---|
| Non-company | 862,532 | 59.1% |
| Non-company | 596,841 | 40.9% |

| IP | Judgment result of Kmeans | Correct result |
|---|---|---|
| 61.148.97.86 | Company | Company |
| 219.239.9.5 | Company | Company |
| 203.187.171.67 | Company | Company |
| 27.115.26.170 | Company | Company |
| 211.94.36.133 | Company | Company |
| 221.8.96.12 | Company | Company |
| 124.126.245.14 | Company | Company |
| 222.131.232.139 | Non-company | Home |
| 221.218.171.133 | Non-company | Home |
| 122.141.212.24 | Non-company | Home |
| 221.216.54.38 | Non-company | Home |
| 58.18.96.34 | Company | Internet bar |
| 58.42.248.26 | Non-company | Internet bar |
| 218.75.156.34 | Non-company | Internet bar |
| 58.18.4.36 | Company | Internet bar |
| 221.218.169.4 (Sometimes PC, sometimes internet bar computer) | Non-company | Internet bar |
| 202.118.253.110 | Non-company | School |
| 220.169.30.220 | Non-company | School |

It can be seen from the data result of table 8 that, as compared to the result clustered by the Kmeans1, the effect clustered by the Kmeans2 is improved, wherein IPs of an internet bar and other public place, etc. are separated from company IPs clustered by the Kmeans1, and the correct rate can reach 88.89%, which obviously improves the accuracy of the clustering, that is, improves the accuracy of judging a company IP from user IPs.

Figure 2:
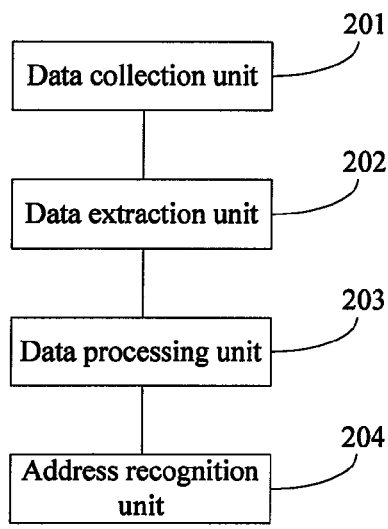
FIG. 2 shows a schematic diagram of a system for recognizing an IP address of a specified category according to an embodiment of the invention.

Corresponding to the method for recognizing an IP address of a specified category provided by the embodiment of the invention, an embodiment of the invention further provides a device for recognizing an IP address of a specified category. With reference to FIG. 2, the device comprises the following units.

A data collection unit 201 is configured to collect behavior record data of several IP addresses.

In particular, collect behavior record data of user IP addresses and performing certain analysis on the behavior record data to recognize an IP address of a category specified by user IPs. In an embodiment of the invention, primarily, behavior logs of four products of a user IP using security software, opening a security software main interface, using anti-virus software, and using a browser are recorded as a data source. The step S101 of the above described method can collect data by the data collection unit 201, and the related technical features can also refer to the detailed description of the part of the step S101, which will not be repeated here.

A data extraction unit 202 is configured to extract preprocessing data from the collected behavior record data, the extracted preprocessing data comprising at least address information of an IP address and time information of a behavior.

The data collection unit 201 collects the behavior record data of a user IP. To accomplish the object of the invention, that is, to recognize whether a user IP is an IP address of a specified category according to behavior-time distribution data of the user IP, the data extraction unit 202 performs extraction on the data collected by the data collection unit 201, and extracts data required for achieving the object of the invention. In an embodiment of the invention, primarily, the address information of a user IP and the time information of producing a behavior are extracted, and further the number of user terminals and the user terminal identifications mids corresponding to each IP address are extracted. The step S102 of the above described method can perform extraction by the data extraction unit 202 on the behavior record data collected by the data collection unit 201, and the related technical features can refer to the detailed description of the part of the step S102, which will not be repeated here.

A data processing unit 203 is configured to process and analyze the extracted preprocessing data to obtain behavior-time distribution data of a user using each IP address.

In particular, the data processing unit 203 comprises: a first statistical unit mainly configured to count the number of user terminals corresponding to each IP address; and a second statistical unit mainly configured to divide preprocessing data of each IP address of which the number of user terminals is greater than a threshold into multiple dimensions according to the difference in behavior time, and count the number of user terminals by which users use each IP address in a different period of time. Thus, by the number of user terminals by which users use each IP address in a different period of time and the total number of user terminals corresponding to each IP address counted by the first statistical unit and the second statistical unit, the data processing unit 203 performs normalization processing on the counted data to obtain the behavior distribution data of a user using each IP address for subsequently recognizing a user IP employing a certain method. The step S103 of the method can perform processing and analysis by the data processing unit 203 on the preprocessing data extracted by the data extraction unit 202 to obtain the behavior-time distribution data of a user IP, and the related technical features can refer to the detailed description of the part of the step S103, which will not be repeated here.

An address recognition unit 204 is configured to recognize an IP address of a specified category at least according to the behavior-time distribution data of a user using the IP address.

According to the behavior-time distribution data of a user IP obtained by the data processing unit 203, the address recognition unit 204 employs a certain method to recognize the user IP. In a specific application, there are multiple ways of implementation, wherein the address recognition unit 204 comprises a first cluster analysis unit configured to perform cluster analysis on multiple IP addresses by combining one or more kinds of clustering mode, to recognize an IP address of a specified category. Therein, when employing a combination of multiple kinds of clustering for multiple IP addresses, the cluster analysis unit comprises a first cluster analysis unit configured to select from the several IP addresses collected by the data collection unit 201 at least two IP addresses known to belong to different categories as initial nodes of a first clustering mode, and based on the behavior-time distribution data of each IP address and the behavior-time distribution data of the initial nodes, perform clustering on the collected multiple IP addresses employing the first clustering mode to recognize IP addresses of individual categories. Optionally, in an embodiment of the invention, the first clustering mode is the Kmeans.

Since IP addresses of a certain category recognized by the Kmeans may not be pure, the cluster analysis unit 204 further comprises a second cluster analysis unit mainly configured to perform sampling cluster analysis on the recognized IP addresses of a specified category employing a second clustering mode, to obtain the data distribution characteristics of IP addresses of the specified category. In an embodiment provided by the invention, the second clustering mode is the DBScan.

Since the DBScan algorithm performs sampling cluster analysis, and is not suitable for processing large data, it is necessary to perform third-time cluster analysis again according to the behavior data distribution characteristics obtained by the DBScan algorithm. Third-time clustering is employed according to the data distribution characteristics of IP addresses of a specified category obtained by the second cluster analysis unit. Therefore, the cluster analysis unit 204 further comprises a third cluster analysis unit mainly configured to modify the initial nodes of the first clustering mode according to the data distribution characteristics obtained by employing the second clustering mode, and adopt the modified initial nodes to perform clustering again on the multiple IP addresses of a specified category recognized previously employing the first clustering mode, to further purify the IP addresses of the specified category. In the embodiment of the invention, taking the company as an example, by further clustering company IPs clustered by the first-time Kmeans, non-company IPs hidden in the company IPs are recognized, which improves the accuracy of recognizing an IP address. The above described step S104 can perform IP address recognition by the address recognition unit 204, and the related technical features can refer to the description of the part of the step S104, which will not be repeated here.

In a practical application, IP addresses of a specified category have certain distribution characteristics in terms of behavior-time, and therefore after the data processing unit 203 obtains the behavior-time distribution data of a user IP, the address recognition unit 204 compares distribution characteristics of a specified category in terms of behavior-time in practical applications according to the above behavior-time distribution data, to recognize whether the user IP belongs to IP addresses of the specified category.

Figure 3:
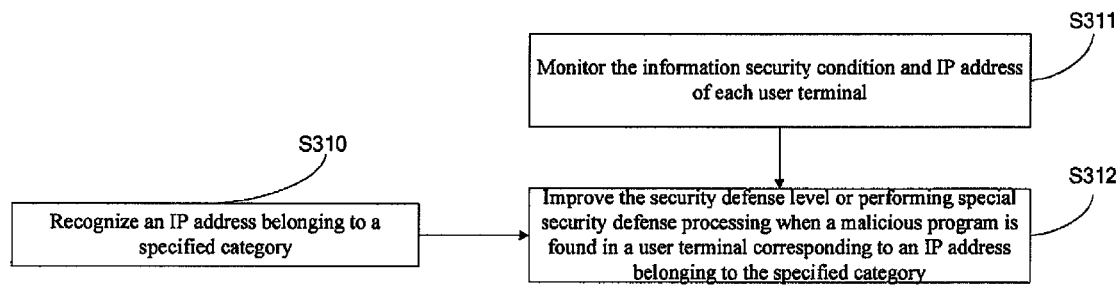
FIG. 3 shows a flow chart of a method for improving security defense of a user terminal according to an embodiment of the invention.

Reference is made to FIG. 3, which shows a flow chart of a method for improving security defense of a user terminal according to an embodiment of the invention. In the following, the method provided by the invention will be described in detail according to FIG. 3. The method for improving security defense of a user terminal provided by the invention comprises:

S310, recognizing an IP address of a specified category according to each embodiment of the method for recognizing an IP address of a specified category provided by the invention as described above, a specific recognition procedure of which can refer to the detailed description of the steps S101, S102, S103 and S104, and will not be repeated here;

S311, monitoring the information security condition and IP address of each user terminal, a specific monitoring mode of which can employ existing or future various monitoring modes, and is not limited by the embodiment of the invention; and S312, improving the security defense level or performing special security defense processing when a malicious program is found in a user terminal corresponding to the IP address of the specified category.

In a specific application, in the embodiment of the invention, on one hand, an IP address is recognized by the step S310 to recognize a certain specified category, for example, a company IP. On the other hand, the information security condition of a user terminal of the IP address is monitored in real time by the step S311, so as to learn about the security condition of each user terminal at any time. When it is found by the step S311 that in a user terminal of a certain category, e.g., a company IP, there exists a malicious program, for example, a trap door, a Trojan horse, a worm and a virus, etc., it poses a threat to the security of the user terminal. Since when a malicious program occurs in a terminal of a company IP, in the event of causing damage, the consequence will be relatively serious, therefore, the security defense level of the user terminals under the company IP can be improved by the step S312, that is, enhance the security defense capability of these user terminals to exempt them from the attack of a malicious program. Of course, special security defense processing can also be performed. For example, when a virus is found in a user terminal of a company IP, anti-virus software can be used to remove the virus; if a malicious plug-in occurs, e.g., bundle installation of application software, no uninstall item, the application software can be forcibly uninstalled utilizing security software, or also perform security defense processing on the user terminal by other approach.

Figure 4:
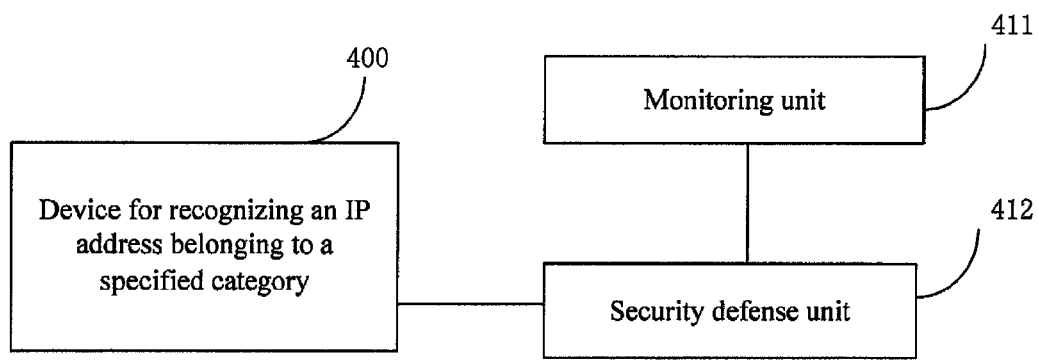
FIG. 4 shows a schematic diagram of a system for improving security defense of a user terminal according to an embodiment of the invention.

With reference to FIG. 4, corresponding to the method for improving security defense of a user terminal provided by the invention, the invention further provides a system for improving security defense of a user terminal, which comprises:

a device 410 for recognizing an IP address of a specified category, wherein an IP address of a specified category is recognized by the device. A specific implementation of the device can be the device embodiment as shown above in FIG. 2, the specifics of which can refer to the structure of the device and will not be repeated here.

In addition to the device 410 for recognizing an IP address of a specified category, the system for improving security defense of a terminal further comprises two units, a monitoring unit 411 and a security defense unit 412, respectively. In the following, the two units will be described.

The monitoring unit 411 is configured to monitor the information security condition and IP address of each user terminal.

The security defense unit 412 is configured to improve the security defense level or perform special security defense processing when the monitoring unit finds a malicious program in a corresponding user terminal pertaining to an IP address of the specified category.

In a specific application, in the process of recognizing a user IP by the device for recognizing an IP address, the monitoring unit 411 can monitor in real time the information security condition and user IP address of a user terminal simultaneously, to learn about the security condition of the user terminal timely. When it is monitored by the monitoring unit 411 that there is a malicious program in a user terminal of a certain category (e.g., a category of company IPs), the security defense unit 412 can improve the security defense level of the user terminals of the category or perform special security defense processing. The step S311 in the embodiment of the above method can monitor the information security condition of a user terminal by the monitoring unit 411 here, and likewise, the step 312 can improve the security defense level of a user terminal or perform special security defense processing by the security defense unit 412 here, and the related technical features can refer to the description of the steps S311, S312, and will not be repeated here.

According to a method and device for recognizing an IP address of a specified category disclosed by the invention, the behavior-time distribution data of a user using an IP address is obtained by collecting, analyzing and processing data, and an IP address of a specified category is recognized by employing a certain method according to the behavior-time distribution data of the user IP, and is not recognized purely by means of the number of user terminals corresponding to a single IP, which can more accurately locate a company outlet IP address, and improves the accuracy of recognition. In addition, the invention employs a way of combining multiple clustering algorithms, and does not purely rely on one clustering algorithm as in the prior art. The pure use of one clustering algorithm in the prior art easily computes an IP address of other category as an IP address of the specified category, for example, the Kmeans, or can not rapidly process a large amount of data, for example, the DBScan, and therefore, employment of combined clustering of multiple algorithms increases the accuracy of clustering and the speed of clustering, that is, improves the accuracy and efficiency of recognizing that a user IP is an IP address of the specified category. Further, using the number of user terminals corresponding to a user IP to recognize which category of IP addresses the user IP belongs to in the prior art is combined with the method provided by the invention, and IP addresses of a certain category are recognized by the prior art at first, which decreases the amount of data of subsequently recognizing an IP address of the specified category, and also reduces the burden of a computer processing the data.

In addition, the invention further discloses a method and system for improving security defense of a user terminal, which first recognizes an IP address of a specified category by the method and system for recognizing an IP address of a specified category provided by the invention. Since in practice, more attention is paid to the information security of user terminals of IP addresses of a certain category, the security information condition of a user terminal and the IP address of the user terminal are also monitored at the same time when recognizing an IP address. When it is monitored that a malicious program exists in user terminals of the specified category, improve the security level of these user terminals or perform special security defense processing, which can improve the security of the use of terminals with respect to a user group of a certain category.

In addition, by the inventive solutions, an IP address of a specified category can be recognized accurately. In an embodiment provided by the invention, the number of user terminals of each IP address and the number of user terminals using a certain product are also counted, the using condition of a certain product used by user groups belongs to IP addresses of various categories can be learned about preliminarily, and better product services can be provided to these certain user groups according to the using condition of the product.

The algorithms and displays provided here are not inherently related to any specific computer, virtual system or other device. Various general-purpose systems may also be used with the teachings herein. According to the above description, the structure required for constructing such systems is obvious. In addition, the invention is not directed to any specific programming language. It should be understood that the content of the invention described herein may be carried out utilizing various programming languages, and that the above description for a specific language is for the sake of disclosing preferred embodiments of the invention.

In the specification provided herein, a plenty of particular details are described. However, it can be appreciated that an embodiment of the invention may be practiced without these particular details. In some embodiments, well known methods, structures and technologies are not illustrated in detail so as not to obscure the understanding of the specification.

Similarly, it shall be appreciated that in order to simplify the disclosure and help the understanding of one or more of all the inventive aspects, in the above description of the exemplary embodiments of the invention, sometimes individual features of the invention are grouped together into a single embodiment, figure or the description thereof. However, the disclosed methods should not be construed as reflecting the following intention, namely, the claimed invention claims more features than those explicitly recited in each claim. More precisely, as reflected in the following claims, an aspect of the invention lies in being less than all the features of individual embodiments disclosed previously. Therefore, the claims complying with a particular implementation are hereby incorporated into the particular implementation, wherein each claim itself acts as an individual embodiment of the invention.

It may be appreciated to those skilled in the art that modules in a device in an embodiment may be changed adaptively and arranged in one or more device different from the embodiment. Modules or units or assemblies may be combined into one module or unit or assembly, and additionally, they may be divided into multiple sub-modules or sub-units or subassemblies. Except that at least some of such features and/or procedures or units are mutually exclusive, all the features disclosed in the specification (including the accompanying claims, abstract and drawings) and all the procedures or units of any method or device disclosed as such may be combined employing any combination. Unless explicitly stated otherwise, each feature disclosed in the specification (including the accompanying claims, abstract and drawings) may be replaced by an alternative feature providing an identical, equal or similar objective.

Furthermore, it can be appreciated to the skilled in the art that although some embodiments described herein comprise some features and not other features comprised in other embodiment, a combination of features of different embodiments is indicative of being within the scope of the invention and forming a different embodiment. For example, in the following claims, any one of the claimed embodiments may be used in any combination.

Embodiments of the individual components of the invention may be implemented in hardware, or in a software module running on one or more processors, or in a combination thereof. It will be appreciated by those skilled in the art that, in practice, some or all of the functions of some or all of the components in a method and device for judging that a user IP is a company IP according to embodiments of the invention may be realized using a microprocessor or a digital signal processor (DSP). The invention may also be implemented as a device or apparatus program (e.g., a computer program and a computer program product) for carrying out a part or all of the method as described herein. Such a program implementing the invention may be stored on a computer readable medium, or may be in the form of one or more signals. Such a signal may be obtained by downloading it from an Internet website, or provided on a carrier signal, or provided in any other form.

Figure 5:
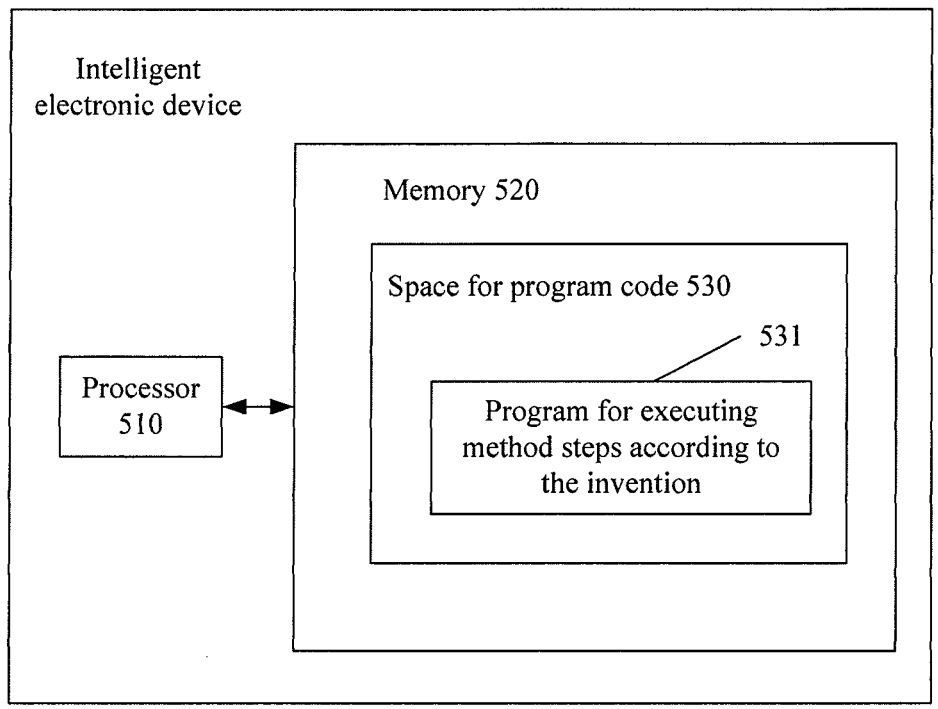
FIG. 5 shows a block diagram of an intelligent electronic device for carrying out a method according to the invention.
Figure 6:
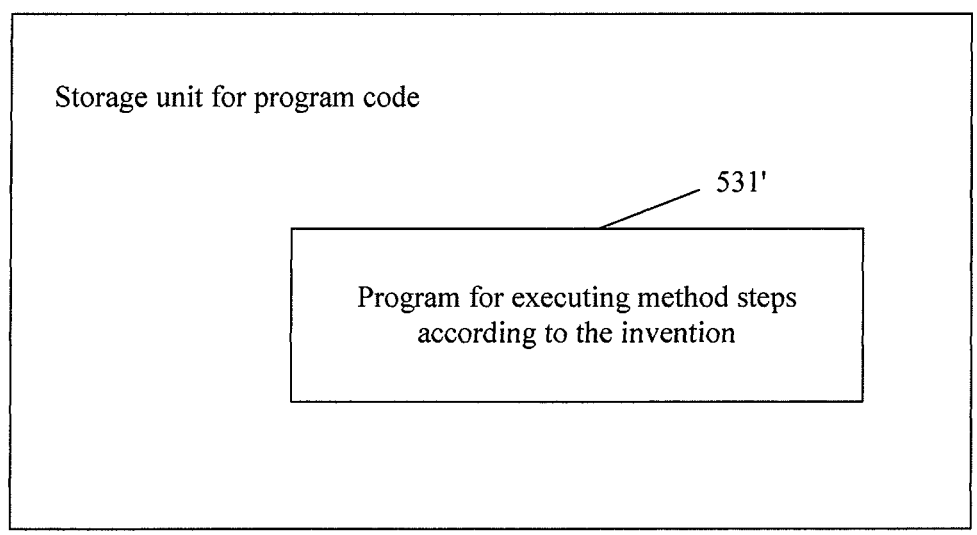
FIG. 6 shows a schematic diagram of a storage unit for retaining or carrying a program code implementing a method according to the invention.

For example, FIG. 5 shows an intelligent electronic device which may carry out a method for recognizing an IP address of a specified category and a method for improving security defense of a user terminal according to the invention. The intelligent electronic device traditionally comprises a processor 510 and a computer program product or a computer readable medium in the form of a memory 520. The memory 520 may be an electronic memory such as a flash memory, an EEPROM (electrically erasable programmable read-only memory), an EPROM, a hard disk or a ROM. The memory 520 has a memory space 530 for a program code 531 for carrying out any method steps in the methods as described above. For example, the memory space 530 for a program code may comprise individual program codes 531 for carrying out individual steps in the above methods, respectively. The program codes may be read out from or written to one or more computer program products. These computer program products comprise such a program code carrier as a hard disk, a compact disk (CD), a memory card or a floppy disk. Such a computer program product is generally a portable or stationary storage unit as described with reference to FIG. 6. The storage unit may have a memory segment or a memory space, etc. arranged similarly to the memory 520 in the intelligent electronic device of FIG. 5. The program code may for example be compressed in an appropriate form. In general, the storage unit comprises a program 531' for executing method steps according to the invention, i.e., a code which may be read by e.g., a processor such as 510, and when run by an intelligent electronic device, the codes cause the intelligent electronic device to carry out individual steps in the methods described above.

It is to be noted that the above embodiments illustrate rather than limit the invention, and those skilled in the art may design alternative embodiments without departing the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several apparatuses, several of the apparatuses may be embodied by one and the same hardware item. Use of the words first, second, and third, etc. does not mean any ordering. Such words may be construed as naming.

This application may be applied in a computer system/server, which may be operated together with a multitude of other general- or special-purpose computing system environments or configurations. Examples of well known computing systems, environments and/or configurations suitable for use with a computer system/server comprise, but not limited to, a personal computer system, a server computer system, a thin client, thick client, a hand held or laptop device, a microprocessor-based system, a set-top box, a programmable consumer electronic product, a network personal computer, a small computer system, a large computer system and a distributed cloud computing environment comprising any above system, etc.

A computer system/server may be described in the general context of a computer system executable instruction (such as a program module) executed by a computer system. In general, the program module may comprise a routine, a program, target program, component, logic, data structure, etc., which performs a specific task or implements a specific abstract data type. The computer system/server may be embodied in a distributed cloud computing environment, and in the distributed cloud computing environment, a task is performed by a remote processing device linked by a communication network. In the distributed cloud computing environment, the program module may be located on a local or remote computing system storage medium comprising a storage device.

The invention claimed is:

1. A computer-implemented method for recognizing an IP address of a specified category, comprising:
   collecting, by at least one processor of a computer system, behavior record data of several IP addresses;
   extracting, by the at least one processor, preprocessing data from the collected behavior record data, the extracted preprocessing data comprising at least address information of an IP address and time information of a behavior;
   analyzing, by the at least one processor, the extracted preprocessing data to obtain behavior-time distribution data of a user using the IP address; and
   recognizing, by the at least one processor, the IP address of a specified category at least according to the behavior-time distribution data of the user using the IP address, wherein the recognizing the IP address of the specified category further comprises:
      performing, by the at least one processor, clustering on the several IP addresses by combining one or more kinds of clustering modes based on the behavior-time distribution data of each IP address to recognize the IP address of the specified category, wherein the performing clustering further comprises:
         selecting, by the at least one processor and from the collected several IP addresses, at least two IP addresses known to belong to different categories as initial nodes of a first clustering mode;
         based on the behavior-time distribution data of each IP address and the behavior-time distribution data of the initial nodes, performing, by the at least one processor, clustering on the collected several IP addresses by employing the first clustering mode to recognize multiple IP addresses of the specified category;
         performing, by the at least one processor, sampling cluster analysis on the recognized multiple IP addresses of the specified category by employing a second clustering mode to obtain data distribution characteristics of the specified category;
         modifying, by the at least one processor, the initial nodes of the first clustering mode according to the data distribution characteristics obtained by employing the second clustering mode; and
         adopting the modified initial nodes to perform clustering on the recognized multiple IP addresses of the specified category by employing the first clustering mode to screen out IP addresses of the specified category.

2. The computer-implemented method as claimed in claim 1, wherein the first clustering mode employs a Kmeans algorithm, and the second clustering mode employs a DBScan algorithm.

3. The computer-implemented method as claimed in claim 1, wherein the extracted preprocessing data further comprises a number of user terminals and user terminal identifications corresponding to each IP address, and the analyzing the extracted preprocessing data comprises:
   counting, by the at least one processor, a number of user terminals corresponding to each IP address;
   dividing, by the at least one processor, preprocessing data of each IP address of which the number of user terminals is greater than a threshold into multiple dimensions according to a difference of behavior time, and counting a number of user terminals using each IP address in a different period of time; and
   performing, by the at least one processor, normalization processing on the number of user terminals using each IP address in different periods of time to obtain the behavior-time distribution data of the user using the IP address.

4. A computer-implemented method for improving security defense of a user terminal, comprising:
   recognizing, by the at least one processor, IP addresses of the specified category by the method for recognizing the IP address of the specified category as claimed in claim 1;
   monitoring, by the at least one processor, information security condition and IP address of each user terminal;
   detecting, by the at least one processor, a malicious program in a user terminal having an IP address belonging to the specified category; and
   improving, by the at least one processor, security defense level or performing special security defense processing.

5. A device for recognizing an IP address of a specified category comprising:
   a first non-transitory memory having first instructions stored thereon;
   a first processor configured to execute the first instructions to perform at least:
      collecting behavior record data of several IP addresses;
      extracting preprocessing data from the collected behavior record data, the extracted preprocessing data comprising at least address information of an IP address and time information of a behavior;

analyzing the extracted preprocessing data to obtain behavior-time distribution data of a user using the IP address; and recognizing the IP address of the specified category at least according to the behavior-time distribution data of the user using the IP address, wherein recognizing the IP address of the specified category further comprises:

performing cluster analysis on the several IP addresses by combining one or more kinds of clustering mode based on the behavior-time distribution data of each IP address to recognize the IP address of the specified category, wherein the performing the cluster analysis further comprises:

selecting, from the collected several IP addresses, at least two IP addresses known to belong to different categories as initial nodes of a first clustering mode;

based on the behavior-time distribution data of each IP address and the behavior-time distribution data of the initial nodes, performing clustering on the collected several IP addresses by employing the first clustering mode to recognize multiple IP addresses of the specified category;

performing sampling cluster analysis on the recognized multiple IP addresses of the specified category by employing a second clustering mode to obtain data distribution characteristics of the specified category; and modifying the initial nodes of the first clustering mode according to the data distribution characteristics obtained by employing the second clustering mode; and adopting the modified initial nodes to perform clustering on the recognized multiple IP addresses of the specified category by employing the first clustering mode to screen out IP addresses of the specified category.

6. A system for improving security defense of a user terminal comprising:

a recognition device for recognizing the IP address of the specified category as claimed in claim 5, and further comprising:

a second non-transitory memory having second instructions stored thereon;

a second processor configured to execute the second instructions to perform at least:

monitoring information security condition and IP address of each user terminal;

detecting a malicious program in a user terminal corresponding to the IP address of the specified category recognized by the recognition device;

improving security defense level or performing special security defense processing.

7. A non-transitory computer readable medium having instructions stored thereon that, when executed by at least one processor, cause the at least one processor to perform at least:

collecting behavior record data of several IP addresses;

extracting preprocessing data from the collected behavior record data, the extracted preprocessing data comprising at least address information of an IP address and time information of a behavior;

analyzing the extracted preprocessing data to obtain behavior-time distribution data of a user using the IP address; and recognizing the IP address of a specified category at least according to the behavior-time distribution data of the user using the IP address, wherein recognizing the IP address of the specified category further comprise:

performing, by the at least one processor, cluster analysis on the several IP addresses by combining one or more kinds of clustering modes based on the behavior-time distribution data of each IP address to recognize the IP address of the specified category, wherein the performing the cluster analysis further comprises:

selecting, by the at least one processor and from the collected several IP addresses, at least two IP addresses known to belong to different categories as initial nodes of a first clustering mode;

based on the behavior-time distribution data of each IP address and the behavior-time distribution data of the initial nodes, performing clustering on the collected several IP addresses employing the first clustering mode to recognize multiple IP addresses of the specified category;

performing, by the at least one processor, sampling cluster analysis on the recognized multiple IP addresses of the specified category by employing a second clustering mode to obtain data distribution characteristics of the specified category; and modifying, by the at least one processor, the initial nodes of the first clustering mode according to the data distribution characteristics obtained by employing the second clustering mode; and adopting the modified initial nodes to perform clustering on the recognized multiple IP addresses of the specified category by employing the first clustering mode to screen out IP addresses of the specified category.

* * * * *